June 29, 1937.  C. BENDER  2,085,070
SEALABLE TAG
Filed April 28, 1937
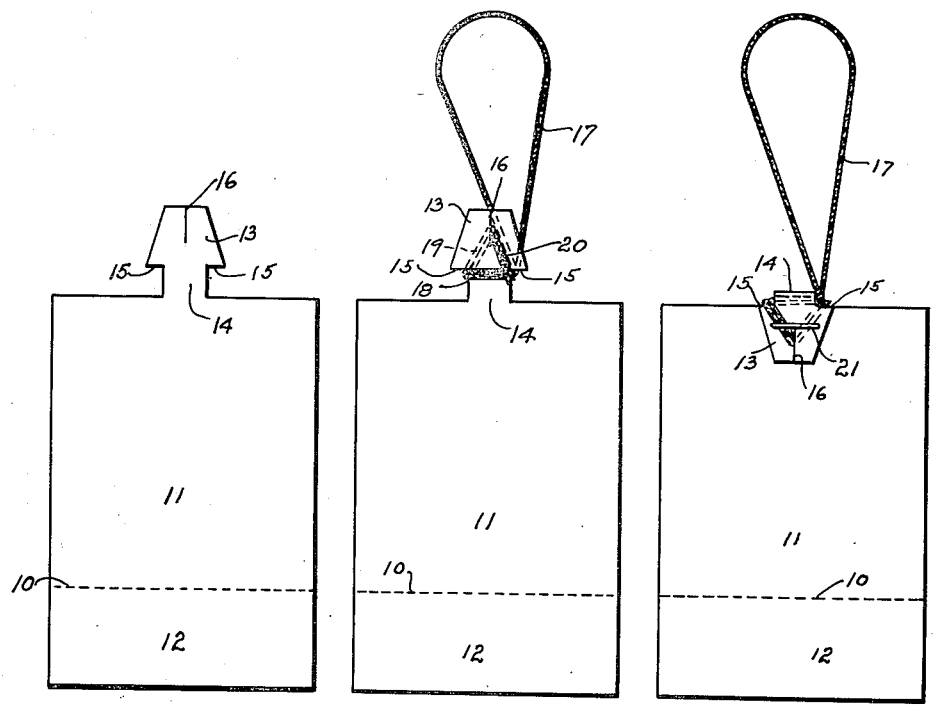
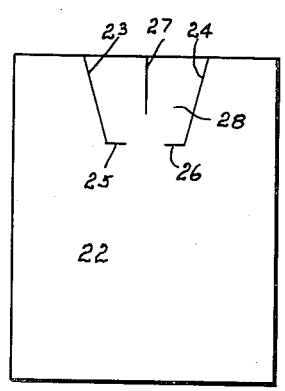
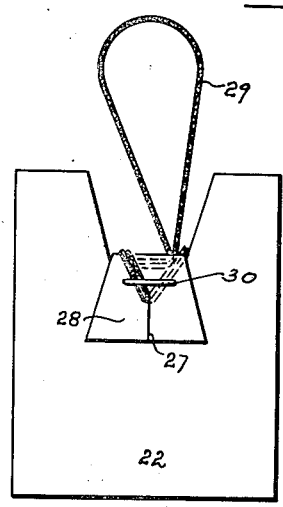
INVENTOR.
Charles Bender,
BY
ATTORNEY.

Patented June 29, 1937

2,085,070

UNITED STATES PATENT OFFICE 2,085,070

SEALABLE TAG

Charles Bender, Brooklyn, N. Y.

Application April 28, 1937, Serial No. 139,479

3 Claims. (Cl. 40—21)

The invention relates to tags used on articles which are checked for a period of time at parking spaces, check rooms or similar places and for other purposes where tags may be used as, for example, for price tags. The invention has for its main object to provide a tag which may be secured on any article, which will not readily be accidentally displaced or removed from the article, and which can not be taken off and replaced without it being noticeable. Another object is to provide a tag which once having been sealed on an article cannot be used again. A further object is to provide a tag of very simple and inexpensive construction which can be attached to any article with a minimum expenditure of time and labor.

These and various other objects and advantages will be readily understood from the following description and from the accompanying drawing of preferred embodiments of the invention, in which, however, modifications may be made without departing from the scope of the appended claims. In the drawing, Fig. 1 is a plan view of a tag made in accordance with the invention;

Fig. 2 illustrates the first step in securing the loop to the tag;

Fig. 3 shows the manner in which the tag is finally sealed to an object;

Fig. 4 is a plan view of a somewhat modified tag; and

Fig. 5 shows how this tag is sealed.

Referring first to Figs. 1, 2, and 3, the tag consists of a piece of cardboard, or other suitable material, which is preferably perforated, as shown at 10, so as to separate the tag into two parts; 11 being the tag proper and 12 the ticket attached thereto. A tongue 13 is formed at the upper end of the tag and provided with a narrow neck 14 so that two shoulders 15 are formed. A slit 16 is cut in the end of the tongue.

When the tag is to be attached to an article which is to be checked or stored, the ticket 12 is removed and handed to the person checking the article. A loop 17, which may either be made of wire or cord, is looped around the article and the end of this loop is turned under the shoulders 15, as shown at 18, then back of the tongue, as shown at 19, through the slit 16 and down over the front of the tongue, as shown at 20. Finally the tag is folded over, as shown in Fig. 3, and a staple 21 is clinched through the tag and the tongue, as shown. In this manner the ends of the loop are so effectively clamped between the tongue and the tag that they cannot be withdrawn without tearing the tag.

In Fig. 4, instead of the tongue being formed, as in the case just described, it is cut from the tag 22 itself by forming two slits 23 and 24, which terminate in short slits 25 and 26 extending towards each other. A slit 27 is cut in the center of the tongue 28. The loop 29 is secured to the tongue in the manner described for the other embodiment and a staple 30 secures the loop to the tag. This tag may, of course, also be made with a removable ticket when desired.

Having described the invention and its objects, what I claim as new and wish to protect by Letters Patent is:—

1. A tag of the class described comprising a piece of material having a tongue formed at one end, an undercut portion provided on said tongue and a slit cut in the free end of the tongue, a looped tying member adapted to be secured around an article, the free end of said looped tying member wound around the undercut part of the tongue and through the slit in the end of the tongue, the tongue folded over against the tag, and a staple clinched through the tag and the tongue to secure the ends of the tying loop.

2. A tag of the class described comprising a piece of material having a tongue extending from one end, an undercut portion provided on said tongue and a slit cut in the free end of the tongue, a looped tying member adapted to be secured around an article, the free end of said looped tying members wound around the undercut part of the tongue and through the slit in the end of the tongue, the tongue folded over against the tag, and a staple clinched through the tag and the tongue to secure the ends of the tying loop.

3. A tag of the class described comprising a piece of material slitted at one end to form a tongue, an undercut portion provided in said tongue and a slit cut in the free end of the tongue, a looped tying member adapted to be secured around an article, the free end of said looped tying member wound around the undercut part of the tongue and through the slit in the end of the tongue, the tongue folded over against the tag, and a staple clinched through the tag and the tongue to secure the ends of the tying loop.

CHARLES BENDER.